US 11,198,455 B2

(12) United States Patent
Yokoyama et al.

(10) Patent No.: US 11,198,455 B2
(45) Date of Patent: Dec. 14, 2021

(54) CONNECTING HANGER BOLT AND CONNECTING HANGER BOLT INSTALLATION MECHANISM

(71) Applicant: KAWASAKI JUKOGYO KABUSHIKI KAISHA, Kobe (JP)

(72) Inventors: Mitsuru Yokoyama, Kobe (JP); Kazuya Tanigawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 360 days.

(21) Appl. No.: 16/173,300

(22) Filed: Oct. 29, 2018

(65) Prior Publication Data

US 2019/0126947 A1 May 2, 2019

(30) Foreign Application Priority Data

Oct. 31, 2017 (JP) .............................. JP2017-211056

(51) Int. Cl.
*B61D 17/04* (2006.01)
*F16B 5/02* (2006.01)
*B62D 27/06* (2006.01)

(52) U.S. Cl.
CPC .......... *B61D 17/043* (2013.01); *F16B 5/0225* (2013.01); *F16B 5/0241* (2013.01); *B62D 27/065* (2013.01); *F16B 5/0258* (2013.01)

(58) Field of Classification Search
CPC ...... F16B 7/187; F16B 37/046; F16B 37/045; F16B 5/0225; F16B 5/0241; F16B 5/0258; E04B 1/4107; B61D 17/043; B62D 27/065
See application file for complete search history.

(56) References Cited

U.S. PATENT DOCUMENTS

| | | | | |
|---|---|---|---|---|
| 1,155,243 A | * | 9/1915 | Jordahl | E04B 1/4107 52/710 |
| 3,845,860 A | * | 11/1974 | Ladouceur | F16B 27/00 206/338 |
| 4,540,309 A | * | 9/1985 | Hansson | E04B 1/4107 403/230 |
| 4,662,590 A | * | 5/1987 | Hungerford, Jr. | F16L 3/2431 248/72 |
| 4,961,553 A | * | 10/1990 | Todd | F16B 37/045 248/62 |

(Continued)

FOREIGN PATENT DOCUMENTS

| | | | | |
|---|---|---|---|---|
| CA | 2342031 A1 | * | 9/2002 | ........... A47F 5/0018 |
| GB | 1461111 A | * | 1/1977 | ................ F16B 2/08 |

(Continued)

*Primary Examiner* — Matthew R McMahon
(74) *Attorney, Agent, or Firm* — Oliff PLC

(57) ABSTRACT

A connecting hanger bolt according to an aspect of the present invention is a hanger bolt which is inserted into a hanging groove rail having an opening narrower than the outer diameter of a bolt head and extending in a hanging groove rail longitudinal direction and from which a device is hangable. The connecting hanger bolt includes: a plurality of bolts which move in the hanging groove rail longitudinal direction in the hanging groove rail and whose shaft portions pass through the opening; and a connecting member which connects the plurality of bolts to each other, and keeps an interval in the hanging groove rail longitudinal direction between the plurality of bolts adjacent to each other.

7 Claims, 5 Drawing Sheets

(56) References Cited

U.S. PATENT DOCUMENTS

| | | | | |
|---|---|---|---|---|
| 5,165,628 | A * | 11/1992 | Todd | F16L 3/243 |
| | | | | 248/62 |
| 6,260,813 | B1 * | 7/2001 | Whitcomb | B64D 11/0696 |
| | | | | 244/118.6 |
| 7,234,566 | B2 * | 6/2007 | Simmons | B66B 7/027 |
| | | | | 104/124 |
| 9,637,934 | B2 * | 5/2017 | Wadsworth | E04F 15/02 |
| 9,732,780 | B2 * | 8/2017 | Anderson | B60M 1/20 |
| 9,764,780 | B2 * | 9/2017 | Zehner | B62D 27/023 |
| 10,053,863 | B2 * | 8/2018 | Fenske | E04B 2/88 |
| D828,745 | S * | 9/2018 | Vowels | D8/382 |
| 10,186,791 | B2 * | 1/2019 | Meine | H01R 9/18 |
| 10,266,098 | B1 * | 4/2019 | Cox | B62D 25/2054 |
| 10,456,955 | B2 * | 10/2019 | Scheungraber | B65G 7/12 |
| 2014/0250825 | A1 * | 9/2014 | Richardson | F16B 7/187 |
| | | | | 52/710 |
| 2014/0294498 | A1 * | 10/2014 | Logan | F16B 12/20 |
| | | | | 403/376 |
| 2018/0185970 | A1 * | 7/2018 | Simmons | F24F 13/084 |
| 2019/0126948 | A1 * | 5/2019 | Yokoyama | B61F 1/00 |
| 2019/0376545 | A1 * | 12/2019 | Vowels | F16B 37/046 |
| 2020/0166065 | A1 * | 5/2020 | Vowels | F16B 9/054 |

FOREIGN PATENT DOCUMENTS

| | | | | |
|---|---|---|---|---|
| JP | H05-35535 U | 5/1993 | | |
| JP | 2016-074378 A | 5/2016 | | |
| NL | 1001615 C1 * | 5/1997 | | F16B 7/18 |

* cited by examiner

CONNECTING HANGER BOLT AND CONNECTING HANGER BOLT INSTALLATION MECHANISM

BACKGROUND OF THE INVENTION

(1) Field of the Invention

The present invention relates to a connecting hanger bolt and a connecting hanger bolt installation mechanism.

(2) Description of Related Art

A hanger bolt may be used when a device is installed on a ceiling or under the floor of a railcar (see JP 05-35535 Y). A device is hangable from the hanger bolt. In addition, the hanger bolt can move to an arbitrary location along a hanging groove rail provided on the ceiling or under the floor. Therefore, by using the hanger bolt, it is possible to easily install a device to an arbitrary location.

A plurality of hanger bolts are used for one device in a case of installing the device by using the hanger bolts. As a matter of course, it is necessary to perform positioning of the hanger bolt as many times as the number of hanger bolts to be used. Further, the hanger bolt is not fixed to the hanging groove rail so that the hanger bolt is movable along the hanging groove rail. Therefore, the hanger bolt has a structure such that the hanger bolt easily corotates with a nut when a worker tries to couple the nut to the hanger bolt.

SUMMARY OF THE INVENTION

The present invention has been made in view of the above circumstances, and an object of the present invention is to provide a hanger bolt which can reduce the burden of positioning work and hardly corotates with a nut upon nut coupling.

A connecting hanger bolt according to an aspect of the present invention is a hanger bolt which is inserted into a hanging groove rail having an opening narrower than an outer diameter of a bolt head and extending in a hanging groove rail longitudinal direction and from which a device is hangable. The connecting hanger bolt includes: a plurality of bolts which move in the hanging groove rail longitudinal direction in the hanging groove rail and whose shaft portions pass through the opening; and a connecting member which connects the plurality of bolts to each other, and keeps an interval in the hanging groove rail longitudinal direction between the plurality of bolts adjacent to each other.

According to this configuration, the interval in the hanging groove rail longitudinal direction between the bolts is kept by the connecting member. Therefore, when one bolt is positioned, the other bolt is positioned simultaneously. Therefore, the burden of positioning work is reduced. In addition, since the bolts are connected to each other, the bolt hardly corotates with a nut upon nut coupling.

According to the above configuration, it is possible to provide a hanger bolt which can reduce the burden of positioning work and which hardly corotates with the nut upon nut coupling.

DETAILED DESCRIPTION OF PREFERRED EMBODIMENTS

Figure 1:
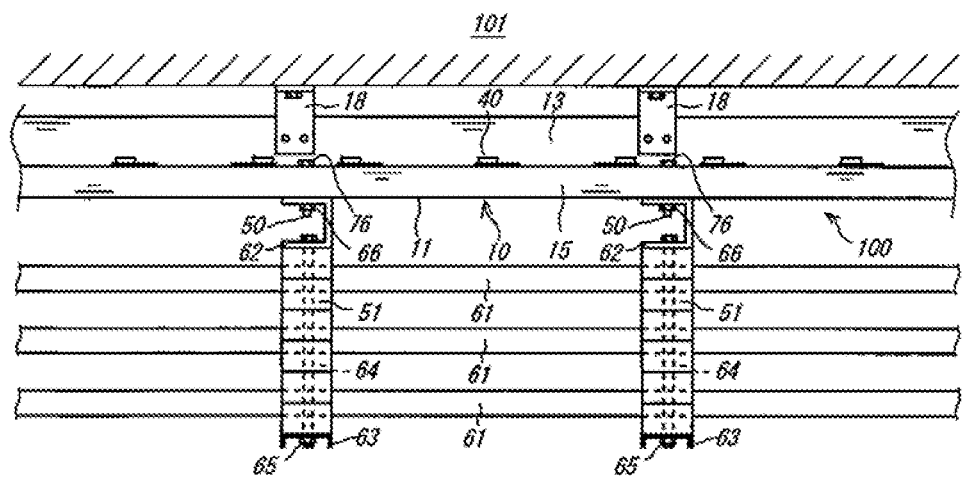
FIG. 1 is a side view of an underfloor duct.

Hereinafter, an embodiment of the present invention will be described with reference to the drawings. Hereinafter, identical reference numerals are given to identical or corresponding elements throughout the drawings, and overlapping explanation will be omitted.

<Underfloor Duct>

First, the entire structure of an underfloor duct 100 will be described. The underfloor duct 100 is provided under the floor of a railcar 101, and stores therein electric equipment including a cable. The underfloor duct 100 extends along the longitudinal direction of the railcar 101. Note that hereinafter, a description will be given in which the longitudinal direction of the railcar 101 is referred to as a "car longitudinal direction", and the width direction of the railcar 101 is referred to as a "car width direction".

Figure 2:
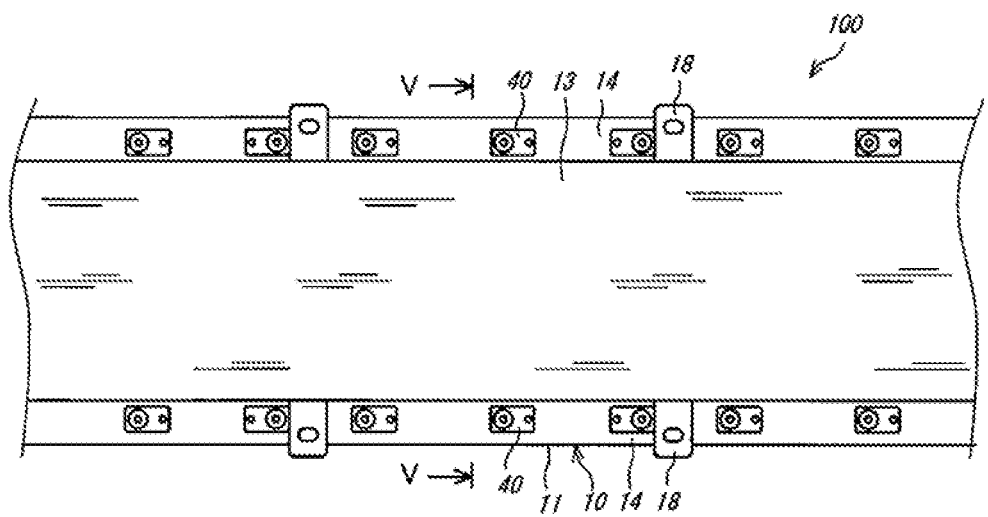
FIG. 2 is a plan view of the underfloor duct.
Figure 3:
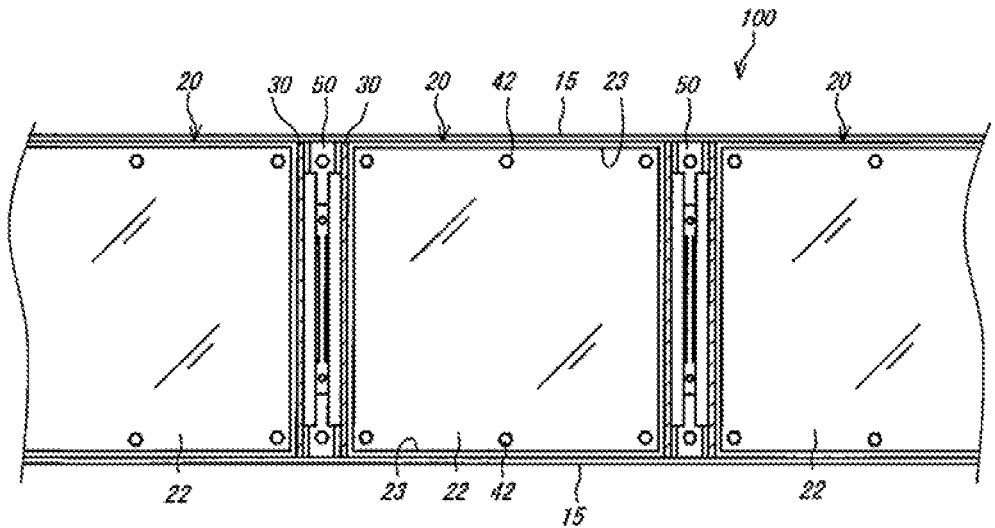
FIG. 3 is a bottom view of the underfloor duct.
Figure 4:
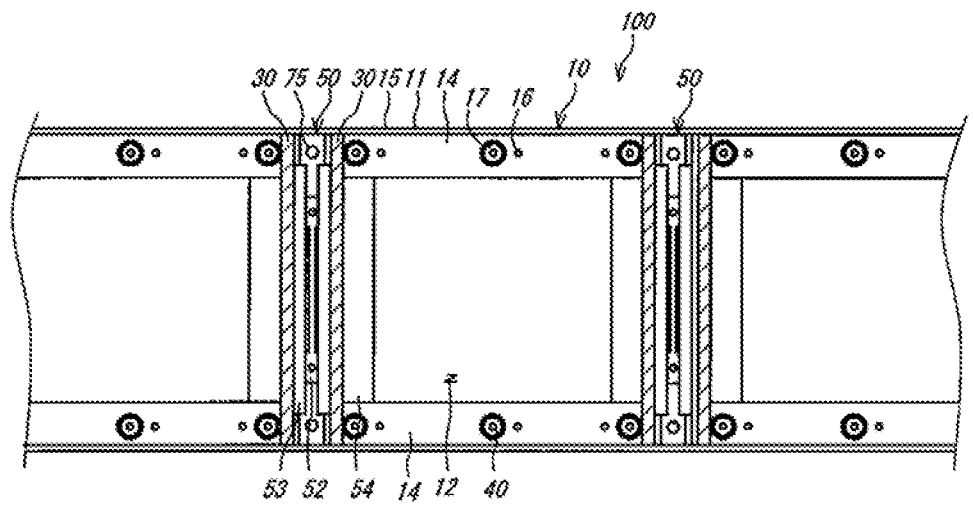
FIG. 4 is a bottom view of the underfloor duct illustrating a state in which a lid is removed.
Figure 5:
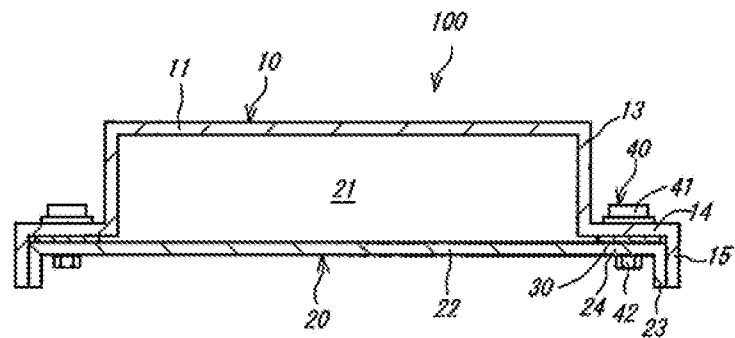
FIG. 5 is a cross-sectional view viewed along arrow V-V in FIG. 2.

FIG. 1 is a side view of the underfloor duct 100, as viewed from the car width direction. The rightward and leftward direction of the paper surface of FIG. 1 is the car longitudinal direction, and the direction vertical to the paper surface is the car width direction. In addition, FIG. 2 is a plan view of the underfloor duct 100, FIG. 3 is a bottom view of the underfloor duct 100, and FIG. 4 is a bottom view of the underfloor duct 100 illustrating a state in which a lid 20 to be described later is removed. The rightward and leftward direction of the paper surface of FIGS. 2 to 4 is the car longitudinal direction, and the upward and downward direction of the paper surface of FIGS. 2 to 4 is the car width direction. Further, FIG. 5 is a cross-sectional view viewed along arrow V-V in FIG. 2, and FIG. 6 is an exploded view of the underfloor duct 100 corresponding to FIG. 5.

Figure 6:
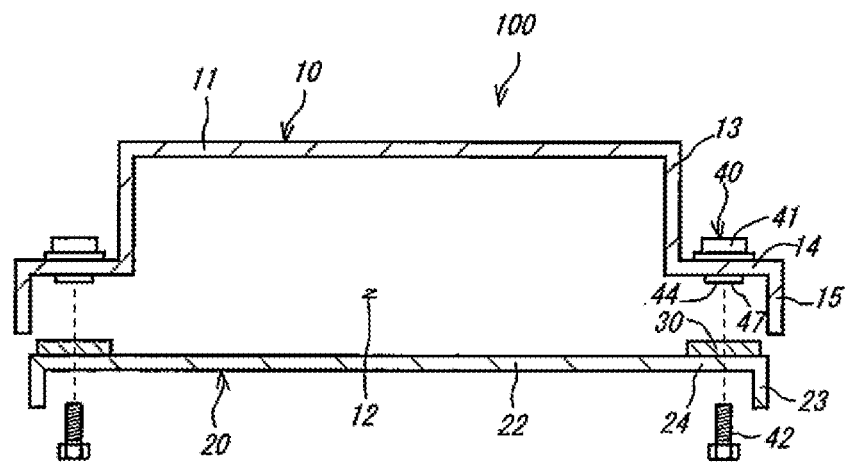
FIG. 6 is an exploded view of the underfloor duct corresponding to FIG. 5.

As illustrated in FIG. 6, the underfloor duct 100 includes a box 10, the lid 20, a seal member 30, and a fixture 40. Further, as illustrated in FIG. 3, the underfloor duct 100 includes a connecting hanger bolt installation mechanism 50. Hereinafter, each of these constituent elements will be explained in order.

As illustrated in FIG. 6, the box 10 has a frame 11 which projects upward, and an opening 12 which opens downward. The frame 11 is formed of a plate member. The frame 11 has: an inverted U-shaped frame main body 13 which opens downward in a cross section vertical to the car longitudinal direction; horizontal portions 14 which extend horizontally outward in the car width direction from both end portions (from a duct passage 21 to be described later) in the car width direction of the frame main body 13; and extension portions 15 which extend downward from both end portions of the horizontal portions 14 in the car width direction.

As illustrated in FIG. 4, a plurality of first rivet holes 16 are formed in the horizontal portion 14 over the entire length in the car longitudinal direction, and a fastening hole 17 is formed at a fixed distance from each of the first rivet holes 16. Note that a combination in which the positional relationship between the first rivet hole 16 and the fastening hole 17 in the car longitudinal direction is opposite is possible. However, even in that case, the distance between the first rivet hole 16 and the fastening hole 17 does not change. In addition, as illustrated in FIG. 1, the box 10 is installed under the floor of the railcar 101 by L-shaped installation members 18 as viewed from the car longitudinal direction.

As illustrated in FIG. 5, the lid 20 is a member that closes the opening 12 of the box 10 and forms the duct passage 21 between the lid 20 and the box 10. In the duct passage 21, electric equipment including a cable is stored. Note that a partition plate, not illustrated, may be provided in the duct passage 21 to divide the inside into a plurality of areas. As illustrated in FIG. 3, the lid 20 has a substantially square shape when viewed from the bottom, and a plurality of the lids 20 are provided over the entire length in the car longitudinal direction of the box 10. The lid 20 is formed of a plate member. As illustrated in FIG. 6, the lid 20 has a flat plate-shaped lid main body 22 extending horizontally, and folded portions 23 extending downward from both end portions in the car width direction and both end portions in the car longitudinal direction of the lid main body 22 (that is, from four sides of the lid main body 22).

Figure 7:
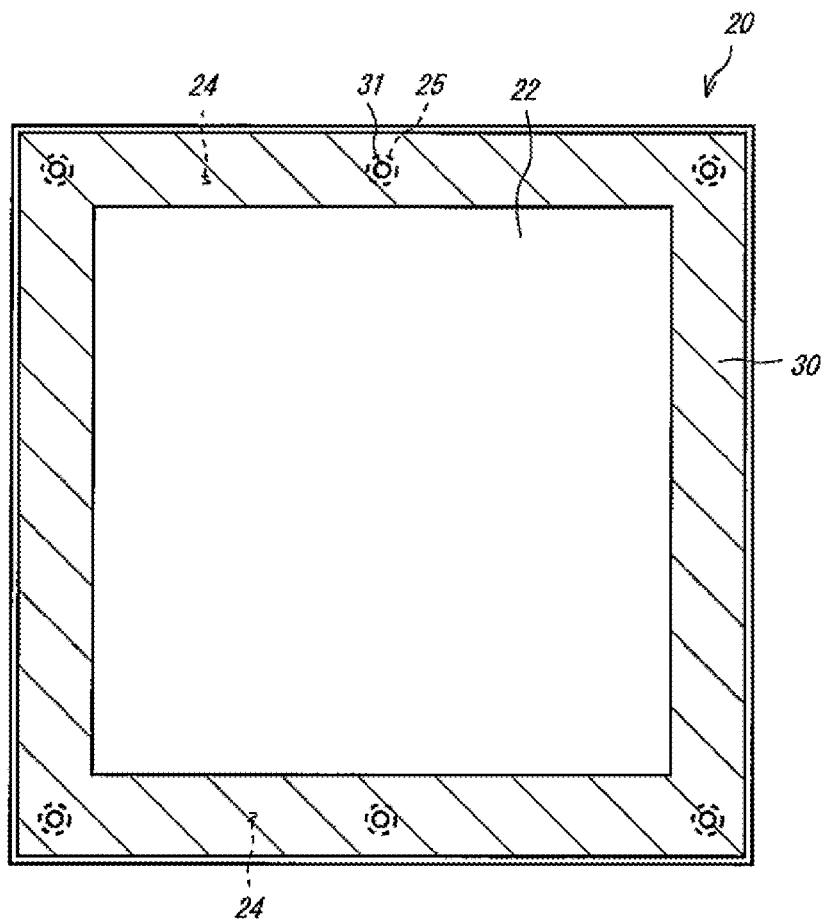
FIG. 7 is a plan view of the lid.

Further, the end portion of the box 10 is located outside the end portion of the lid 20 in the car width direction. More specifically, the extension portion 15 of the box 10 is located outside the folded portion 23 of the lid 20 in the car width direction, and the inner surface of the extension portion 15 is in contact with the outer surface of the folded portion 23. In addition, the lid main body 22 has a lid installation portion 24 extending horizontally outward from the duct passage 21 in the car width direction. Here, FIG. 7 is a plan view of the lid 20 (in a state where the seal member 30 is installed). As illustrated in FIG. 7, in the lid installation portion 24, a bolt hole 25 is formed at a location corresponding to the fastening hole 17 (see FIG. 4) of the box 10.

As illustrated in FIG. 7, the seal member 30 is provided on an outer peripheral section of the upper surface of the lid main body 22 including a section corresponding to the lid installation portion 24 of the lid 20. In addition to the lid main body 22, seal members 30 are provided also on the connecting hanger bolt installation mechanism 50 (backing plate 54) as illustrated in FIG. 4 (see also FIG. 9). As illustrated in FIG. 5, in a state where the lid 20 is installed, the seal member 30 is inserted between the horizontal portion 14 of the box 10 and the lid installation portion 24 of the lid 20, and the seal member 30 is inserted between the lid main body 22 of the lid 20 and the connecting hanger bolt installation mechanism 50 (backing plate 54). Note that as illustrated in FIG. 7, a communication hole 31 is formed at a section corresponding to the bolt hole 25 of the seal member 30 provided on the lid 20. In addition, the seal member 30 of the present embodiment is formed of foam rubber.

Figure 8:
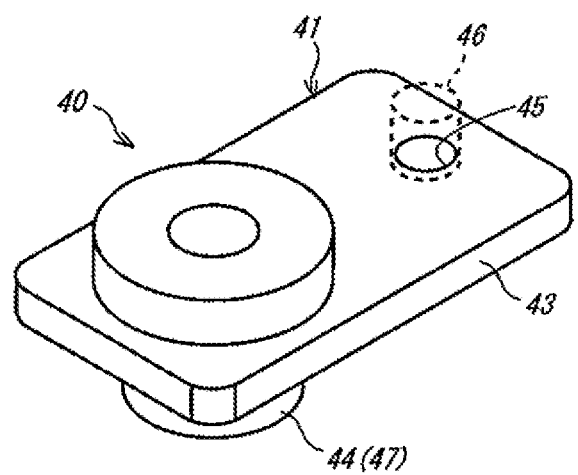
FIG. 8 is a perspective view of a fixing plate.

As illustrated in FIG. 5, the fixture 40 has a fixing plate 41 and a fixing bolt 42, and fastens the horizontal portion 14 of the box 10 and the lid installation portion 24 of the lid 20. The fixing plate 41 is in surface contact with the upper surface of the horizontal portion 14 of the box 10 and is positioned in the upward and downward direction with respect to the box 10. Here, FIG. 8 is a perspective view of the fixing plate 41. As illustrated in FIG. 8, the fixing plate 41 has a plate-shaped plate portion 43 and a projecting portion 47 press-fitted into the plate portion 43 and having a bolt fixing portion 44 in which female threads are formed. Note that the axial center of the bolt fixing portion 44 is vertical to the plate portion 43. In addition, as illustrated in FIG. 6, the bolt fixing portion 44 constitutes the projecting portion 47 which projects to a lower side with respect to the lower surface of the horizontal portion 14 in a state of passing through the fastening hole 17 (see FIG. 4) formed in the horizontal portion 14 of the box 10.

Further, as illustrated in FIG. 8, a second rivet hole 45 is formed in the plate portion 43. The second rivet hole 45 is formed at a location corresponding to the first rivet hole 16 (see FIG. 4) of the box 10. In addition, the second rivet hole 45 has an axial center parallel to the axial center of the bolt fixing portion 44. The fixing plate 41 is fixed to the box 10 by a rivet 46 (the rivet 46 is omitted in FIGS. 1 to 4) passing through both the first rivet hole 16 and the second rivet hole 45. By passing the rivet 46 through the first rivet hole 16 and the second rivet hole 45 as described above, the fixing plate 41 can be positioned in the horizontal direction with respect to the box 10.

As described above, the fixing plate 41 is installed to the box 10 in a state of being positioned in the upward and downward direction and the horizontal direction with respect to the box 10. Then, the fixing bolt 42 passes through the bolt hole 25 of the lid 20 and the communication hole 31 of the seal member 30 from below and is coupled to the bolt fixing portion 44 of the fixing plate 41.

The connecting hanger bolt installation mechanism 50 is a mechanism for installing a device. In the present embodiment, a low-voltage control power line passes through the duct passage 21 of the underfloor duct 100. In contrast, as illustrated in FIG. 1, high-voltage power lines 61 extending in the car longitudinal direction are installed to the connecting hanger bolt installation mechanism 50 with cleats 51. Note that the control power line and the high-voltage power lines 61 are isolated from each other in this manner in order to prevent an electric signal transmitted through the control power line from being affected by electromagnetic interference from the high-voltage power lines 61. Therefore, the frame 11 and the lid 20 are preferably nonmagnetic members, for example, stainless steel plates so that the effect of preventing electromagnetic interference can be enhanced. In addition, as illustrated in FIG. 3, the connecting hanger bolt installation mechanism 50 is installed in the opening 12 of the box 10, and is positioned between the adjacent lids 20. Details of the connecting hanger bolt installation mechanism 50 will be described later.

<Effects and the Like Regarding Underfloor Duct>

As described above, the underfloor duct 100 according to the present embodiment is a duct that is provided under the floor of the railcar 101 and stores electric equipment including a cable. The underfloor duct 100 includes: the box 10 which has the frame 11 projecting upward, and the opening 12 opening downward; and the lid 20 which closes the opening 12 and forms the duct passage 21 between the lid 20 and the box 10. Further, the end portion of the box 10 is located outside the end portion of the lid 20 in the car width direction.

Since the underfloor duct 100 according to the present embodiment is configured as described above, removing the lid 20 that closes the opening 12 of the box 10 enables access to electric equipment with ease. Therefore, inspection of electric equipment can be easily performed. In addition, since the end portion of the box 10 is located outside the end portion of the lid 20, even in a case where water falls on the underfloor duct 100 from above, the water flows down without passing through the lid 20. Therefore, water hardly intrudes into the duct passage 21 even though the underfloor duct 100 has a simple structure.

In addition, in the underfloor duct 100 according to the present embodiment, the box 10 has the horizontal portion 14 extending horizontally outward in the car width direction from the duct passage 21, and the lid 20 has the lid installation portion 24 extending horizontally outward in the car width direction from the duct passage 21. The horizontal portion 14 and the lid installation portion 24 are fastened by the fixture 40.

As described above, in the present embodiment, the horizontal portion 14 and the lid installation portion 24 are fastened by the fixture 40 on the outside in the car width direction with respect to the duct passage 21, and the fixing bolt 42 does not project into the duct passage 21. Therefore, it is possible to fix the lid 20 to the box 10 without damaging the cable in the duct passage 21.

In addition, the underfloor duct 100 according to the present embodiment includes: the seal member 30 which is inserted between the horizontal portion 14 and the lid installation portion 24; and the fixing plate 41 which is in surface contact with the upper surface of the horizontal portion 14 and is positioned in the upward and downward direction with respect to the box 10. Further, the fixing plate 41 has the projecting portion 47 projecting to the lower side with respect to the lower surface of the horizontal portion 14 in a state of passing through the fastening hole 17 formed in the horizontal portion 14.

As described above, since the projecting portion 47 projects to the lower side with respect to the lower surface of the horizontal portion 14, when the lid 20 is fastened to the box 10 by using the fixing bolt 42, an appropriate gap is kept between the box 10 and the horizontal portion 14 by the projecting portion 47. As a result, uneven compression of the seal member 30 due to fastening of the fixing bolt 42 is prevented, and reaction force from the seal member 30 to the lid installation portion 24 also has a fixed value. As a result, deformation of the lid installation portion 24 due to a partial increase in the reaction force caused when the lid 20 is installed to the box 10 can be prevented and permanent deformation of the seal member 30 inserted between the horizontal portion 14 and the lid installation portion 24 due to excessive compression of the seal member 30 can be prevented. Thus, the seal member 30 can be reused.

In addition, in the present embodiment, the fixing plate 41 further has the bolt fixing portion 44 in which the female threads are formed inside the projecting portion 47.

As described above, since the projecting portion 47 has both the function of female threads (the bolt fixing portion 44) and a solid stop function, it is not necessary to provide a member having a solid stop function separately from the bolt fixing portion 44. Therefore, the structure of the underfloor duct 100 can be simplified.

In addition, in the underfloor duct 100 according to the present embodiment, the first rivet hole 16 is formed in the horizontal portion 14 of the box 10, and the second rivet hole 45 is formed at a location corresponding to the first rivet hole 16 in the fixing plate 41. The second rivet hole 45 has the axial center parallel to the axial center of the bolt fixing portion 44 and is positioned in the horizontal direction with respect to the box 10. The underfloor duct 100 has the rivet 46 passing through both the first rivet hole 16 and the second rivet hole 45.

Since the underfloor duct 100 according to the present embodiment is configured as described above, only by fixing the fixing plate 41 to the horizontal portion 14 of the box 10 by using the rivet 46, the fixing plate 41 can be accurately positioned in the upward and downward direction and the horizontal direction. Further, since the fixing plate 41 is fixed to the box 10 by using the rivet 46 instead of welding, even in a case where the bolt fixing portion 44 is damaged, the fixing plate 41 can be easily replaced.

<Connecting Hanger Bolt Installation Mechanism>

Figure 9:
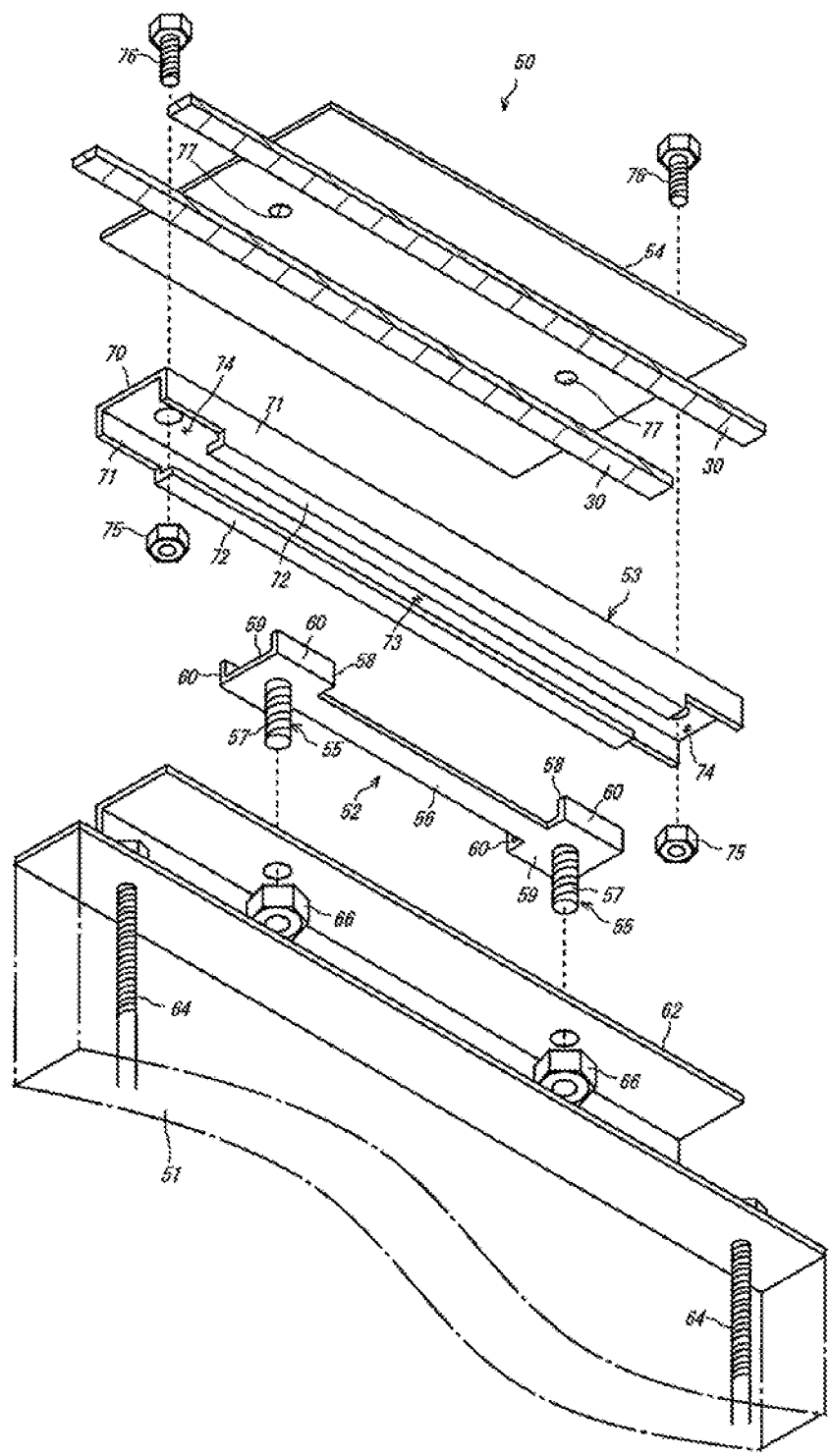
FIG. 9 is an exploded perspective view of a connecting hanger bolt installation mechanism.

Next, details of the connecting hanger bolt installation mechanism 50 will be described. FIG. 9 is an exploded perspective view of the connecting hanger bolt installation mechanism 50 as viewed diagonally from below. Note that the upper-left to lower-right direction of the paper surface of FIG. 9 is the car width direction, and the upper-right to lower-left direction of the paper surface of FIG. 9 is the car longitudinal direction. As illustrated in FIG. 9, the connecting hanger bolt installation mechanism 50 includes a connecting hanger bolt 52, a hanging groove rail 53, and the backing plate 54. In addition, hereinafter, a description will be given in which the longitudinal direction of the hanging groove rail 53 is referred to as a "hanging groove rail longitudinal direction", and the width direction of the hanging groove rail 53 is referred to as a "hanging groove rail width direction".

The connecting hanger bolt 52 has a plurality of (two in the present embodiment) bolts 55 and a connecting member 56 connecting these bolts 55 to each other. The bolt 55 has a shaft portion 57 extending in the upward and downward direction and formed with male threads, and a bolt head 58 which is positioned on the upper side of the shaft portion 57 and to which the shaft portion 57 is fixed. The bolt head 58 has a rectangular plate-shaped main body portion 59 and vertical wall portions 60 extending upward from both end portions of the main body portion 59 in the hanging groove rail width direction. The bolt head 58 has a U shape as viewed from the hanging groove rail longitudinal direction.

The connecting member 56 is a member that extends in the hanging groove rail longitudinal direction and connects the adjacent bolts 55 to each other. Entirety of the connecting hanger bolt 52 including the connecting member 56 is made of metal. The connecting member 56 has rigidity of a fixed level or higher which enables the interval between the adjacent bolts 55 in the hanging groove rail longitudinal direction to be kept without expanding and contracting. In addition, the connecting member 56 is formed in a plate spring shape having low rigidity, and a worker can bend and deform the connecting member 56 by applying force. Note that the connecting member 56 is not limited to the present embodiment as long as the connecting member 56 is configured to have rigidity allowing deformation while maintaining the interval between the bolts by cutting out a portion of the connecting member 56, reducing the plate thickness thereof, using material having low rigidity, or the like.

The hanging groove rail 53 is a member into which the connecting hanger bolt 52 is inserted. The hanging groove rail 53 has a substantially rectangular frame shape as viewed from the hanging groove rail longitudinal direction and includes a top plate portion 70 positioned at the upper portion, side plate portions 71 extending downward from both end portions of the top plate portion 70 in the hanging groove rail width direction, and bottom plate portions 72 extending inward in the hanging groove rail width direction from the lower end portions of the respective side plate portions 71.

In addition, the hanging groove rail 53 has an opening 73 extending in the hanging groove rail longitudinal direction. The opening 73 is formed between both the bottom plate portions 72, and the dimension in the hanging groove rail width direction is smaller than the outer diameter (dimension in the hanging groove rail width direction) of the bolt head 58. Further, the shaft portion 57 of the connecting hanger bolt 52 passes through the opening 73. Since the hanging groove rail 53 and the connecting hanger bolt 52 are configured as described above, the connecting hanger bolt 52 can move in the hanging groove rail longitudinal direction within the hanging groove rail 53.

The connecting hanger bolt 52 is supported from above by the hanging groove rail 53, and the shaft portion 57 projects downward. As illustrated in FIG. 1, the plurality of cleats 51 sandwiching the high-voltage power lines 61 are sandwiched between a cleat fixing member 62 and a lower cleat fixing member 63, and are fixed to one another by a long bolt 64 and a nut 65. In addition, as illustrated in FIG. 9, the cleat fixing member 62 is fixed to the connecting hanger bolt 52 by fastening a hanger nut 66 to the shaft portion 57 of the connecting hanger bolt 52. The order of assembly is not limited. However, for example, after fixing the cleats 51 sandwiching the high-voltage power lines 61 to the cleat fixing member 62, the cleat fixing member 62 is fixed to the connecting hanger bolt 52 by using the hanger nut 66. Thus, the cleats 51 sandwiching the high-voltage power lines 61 can be installed to the hanging groove rail 53. Note that what is installed to the hanging groove rail 53 by using the connecting hanger bolt 52 is not limited to the cleats 51 sandwiching the high-voltage power lines 61, and may be, for example, an underfloor device box or another device.

In addition, the hanging groove rail 53 has bolt takeout portions 74 at both end portions in the hanging groove rail longitudinal direction. The bolt takeout portion 74 is flush with the opening 73 and is positioned between both the side plate portions 71. The bolt takeout portion 74 is opened wider than the outer diameter (dimension in the hanging groove rail width direction) of the bolt head 58. Further, the connecting member 56 of the connecting hanger bolt 52 is formed to have a smaller dimension in the hanging groove rail width direction than that of the opening 73. Therefore, if the connecting member 56 is deformed, the bolt head 58 can be moved in the upward and downward direction in the bolt takeout portion 74.

However, in the hanging groove rail 53, an installation nut 75 is installed to a section corresponding to the bolt takeout portion 74. This installation nut 75 is a nut to be coupled to an installation bolt 76 (see also FIG. 1) so as to install the hanging groove rail 53 to the box 10. However, the installation nut 75 functions as a restricting portion which restricts movement of the connecting hanger bolt 52 to the bolt takeout portion 74. That is, as long as this installation nut 75 is installed, the connecting hanger bolt 52 cannot move to the bolt takeout portion 74. Note that the restricting portion is not limited to the installation nut 75 and may be configured, for example, by projecting a portion of the side plate portion 71 inward in the hanging groove rail width direction.

The backing plate 54 is a plate member fixed to the upper surface of the hanging groove rail 53. As illustrated in FIG. 7, the backing plate 54 is a member for sandwiching the seal member 30 provided on the outer peripheral section of the upper surface of the lid main body 22 between the backing plate 54 and the lid 20 so as to maintain a watertight function. In addition, as illustrated in FIG. 9, the seal member 30 is bonded to the backing plate 54 so as to be pressed against the side plate portion 71 of the hanging groove rail 53. As illustrated in FIG. 4, the seal member 30 fills a gap between the horizontal portion 14 and the backing plate 54 and a gap between the side plate portion 71 of the hanging groove rail 53 and the folded portion 23 of the lid 20, and prevents intrusion of water from the lower surface of the underfloor duct 100.

A rivet hole 77 is formed in the backing plate 54. The backing plate 54 is fixed to the hanging groove rail 53 by a rivet, not illustrated, passing through the rivet hole 77 and a rivet hole, not illustrated, provided in the hanging groove rail 53. In addition, since the bolt head 58 of the connecting hanger bolt 52 has a U-shape, the bolt head 58 does not contact the above-described rivet when the connecting hanger bolt 52 moves.

Note that in the present embodiment, a case where the connecting hanger bolt installation mechanism 50 is provided at the underfloor duct 100 has been described. However, the connecting hanger bolt installation mechanism 50 may be provided at another section. For example, the connecting hanger bolt installation mechanism 50 may be provided inside the car of the railcar 101 and the connecting hanger bolt installation mechanism 50 may be used to install an interior decoration product.

<Effects and the Like Regarding Connecting Hanger Bolt Installation Mechanism>

The connecting hanger bolt 52 according to the present embodiment is a hanger bolt which is inserted into the hanging groove rail 53 having the opening 73 narrower than the outer diameter of the bolt head 58 and extending in the hanging groove rail longitudinal direction and from which a device is hangable. The connecting hanger bolt 52 includes: the plurality of bolts 55 which move in the hanging groove rail longitudinal direction in the hanging groove rail 53 and whose shaft portions 57 pass through the opening 73; and the connecting member 56 which connects the plurality of bolts 55 to each other, and keeps the interval in the hanging groove rail longitudinal direction between the plurality of bolts 55 adjacent to each other.

As described above, in the connecting hanger bolt 52 according to the present embodiment, the interval in the hanging groove rail longitudinal direction between the respective bolts 55 is kept by the connecting member 56. Therefore, when one bolt 55 is positioned, the other bolt 55 is positioned. In a case where a high-voltage power line 61 is installed to a carbody in a conventional structure, a worker has to adjust the positions of a hanger bolt and a corresponding bolt hole for each hanger bolt while lifting the high-voltage power line 61 which is a heavy object. Therefore, work efficiency is low. In contrast, in a case where the connecting hanger bolt 52 according to the present embodiment is used, when the position of one bolt 55 is determined, the position of the bolt 55 adjacent in the car width direction is determined. Therefore, the number of times that position adjustment is performed is reduced, and the burden of work is reduced. In addition, since the bolts 55 are connected to each other, the bolt 55 hardly corotates with the nut upon coupling for installing the nut to the bolt 55.

In addition, the connecting hanger bolt 52 according to the present embodiment is a hanger bolt which is inserted into the hanging groove rail 53 provided with the bolt takeout portions 74 opened wider than the outer diameter of the bolt head 58 at the end portions in the hanging groove rail longitudinal direction, the end portions being flush with the opening 73. The connecting hanger bolt 52 allows the bolt head 58 to move in the upward and downward direction at the bolt takeout portion 74 due to deformation of the connecting member 56.

Therefore, in the connecting hanger bolt 52 according to the present embodiment, the bolt head 58 can be taken out downward from the bolt takeout portion 74 and the connecting hanger bolt 52 can be removed from the hanging groove rail 53. In addition, conversely, the connecting hanger bolt 52 can be assembled to the hanging groove rail 53 from the bolt takeout portion 74.

In addition, in the connecting hanger bolt 52 according to the present embodiment, the connecting member 56 is formed to have a smaller width dimension than that of the opening 73.

Therefore, when the connecting hanger bolt 52 is removed from the hanging groove rail 53, the connecting member 56 is not caught by the bottom plate portions 72 positioned on both sides of the opening 73 in the hanging groove rail width direction. Therefore, the connecting hanger bolt 52 can be more easily removed from the hanging groove rail 53. Further, when the connecting hanger bolt 52 is removed, the connecting hanger bolt 52 does not deform greatly. Therefore, the connecting hanger bolt 52 can be reused.

In addition, the connecting hanger bolt installation mechanism 50 according to the present embodiment includes: the hanging groove rail 53 having the restricting portion (installation nut 75) which is formed on a groove inner surface of the bolt takeout portion 74 and restricts movement of the connecting hanger bolt 52 to the bolt takeout portion 74; and the connecting hanger bolt 52 to be inserted into the hanging groove rail 53.

Therefore, in the connecting hanger bolt installation mechanism 50 according to the present embodiment, it is possible to prevent the connecting hanger bolt 52 from falling off the hanging groove rail 53.

What is claimed is:

1. A connecting hanger bolt being a hanger bolt which is inserted into a hanging groove rail having an opening narrower than an outer diameter of a bolt head and extending in a hanging groove rail longitudinal direction and from which a device is hangable, the connecting hanger bolt comprising:
    a plurality of bolts which move in the hanging groove rail longitudinal direction in the hanging groove rail and whose shaft portions pass through the opening; and
    a connecting member which connects the plurality of bolts to each other, and keeps a distance in the hanging groove rail longitudinal direction between the plurality of bolts adjacent to each other, wherein:
    the shaft portions include male threads;
    bolt heads of the plurality of bolts are configured to move in the hanging groove rail; and
    the entire connecting member is fully located inside the hanging groove rail such that no portion of the connecting member can extend outside thereof, and the connecting member connects the bolt heads to each other.

2. The connecting hanger bolt according to claim 1 being a hanger bolt which is inserted into the hanging groove rail provided with a bolt takeout portion opened wider than an outer diameter of the bolt head at an end portion in the hanging groove rail longitudinal direction, the end portion being flush with the opening,
    wherein the bolt head is allowed to move in an upward and downward direction at the bolt takeout portion due to deformation of the connecting member.

3. The connecting hanger bolt according to claim 2, wherein the connecting member is formed to have a smaller width dimension than a width dimension of the opening.

4. The connecting hanger bolt according to claim 1, wherein tip ends of the bolts which ends are located opposite to the bolt heads are open such that nuts are attachable to the tip ends of the bolts.

5. A connecting hanger bolt installation mechanism comprising:
    a hanging groove rail which has a bolt takeout portion and a restricting portion that is formed on a groove inner surface of the bolt takeout portion and that restricts movement of the connecting hanger bolt according to claim 4 to the bolt takeout portion; and
    the connecting hanger bolt which is inserted into the hanging groove rail.

6. A connecting hanger bolt being a hanger bolt which is inserted into a hanging groove rail having an opening narrower than an outer diameter of a bolt head and extending in a hanging groove rail longitudinal direction and from which a device is hangable, the connecting hanger bolt comprising:
    a plurality of bolts which move in the hanging groove rail longitudinal direction in the hanging groove rail and whose shaft portions pass through the opening; and
    a connecting member which connects the plurality of bolts to each other, and keeps a distance in the hanging groove rail longitudinal direction between the plurality of bolts adjacent to each other, wherein:
    bolt heads of the plurality of bolts are allowed to move in an upward and downward direction by deformation of the connecting member in bolt takeout portions of the hanging groove rail, the bolt takeout portions being flush with the opening;
    each of outer diameters of the bolt heads is smaller than each of widths of the bolt takeout portions;
    the entire connecting member is fully located inside the hanging groove rail such that no portion of the connecting member can extend outside thereof; and
    the connecting member is formed to have a smaller width dimension than a width dimension of the opening.

7. A connecting hanger bolt installation mechanism comprising:
    a hanging groove rail which has a bolt takeout portion and a restricting portion that is formed on a groove inner surface of the bolt takeout portion and that restricts movement of the connecting hanger bolt according to claim 6 to the bolt takeout portion; and
    the connecting hanger bolt which is inserted into the hanging groove rail.

* * * * *